United States Patent Office 3,355,477
Patented Nov. 28, 1967

3,355,477
HEXACOORDINATE SILICON COMPLEXES
Cecil L. Frye, Midland, Mich., assignor to Dow Corning Corporation, Midland, Mich., a corporation of Michigan
No Drawing. Filed Nov. 16, 1964, Ser. No. 411,586
9 Claims. (Cl. 260—448.8)

This application relates to new hexacoordinate silicon complexes and to methods of preparing them.

The existence of hexacoordinate silicon complexes has been known for quite some time. It was over thirty years ago that Rosenheim, Raibmann and Schendel reported such complexes in "Z. Anorg. Allgem. Chem. 196, 160, (1931)." In spite of the fact that complexes of this type have been known for so long, they have generally been of academic interest only and even in the academic realm very little work has been done on them.

It has now been discovered that complexes similar to those prepared by Rosenheim and his co-workers can be prepared. These newly discovered complexes contain unprotonated amine. Thus, this invention is directed to new hexacoordinate silicon complexes having the general formula

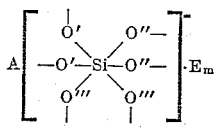

wherein the O' oxygen atoms are attached to carbon atoms of aromatic ring which are ortho to each other, the O'' oxygen atoms are attached to carbon atoms of an aromatic ring which are ortho to each other, the O''' oxygen atoms are attached to carbon atoms of an aromatic ring which are ortho to each other, A is a cation formed from an amine, E is unprotonated amine and $m$ has a value greater than zero.

It is the object of this invention to provide new hexacoordinate silicon complexes having the above formula and to provide a method for their preparation. The complexes provided in accordance with the objects of this invention are useful as catalysts or curing agents for epoxy resins, molding compounds, epoxy-anhydride resins and silicone rubbers.

Broadly, the complexes of this invention are prepared by reacting (1) silica or a suitable silica source with (2) an aromatic compound having at least two hydroxy groups on the aromatic ring which are ortho to each other and (3) an amine.

Reaction of the three ingredients to produce the new complexes can be carried out at room temperature or one can heat a mixture of the three reactants. The amount of heating employed, if any, is not critical so far as is known, and can vary from a simple warming of the mixture to heating the mixture at reflux. When the amine is a strong base, the reaction will proceed rapidly even at room temperature and even at high dilution in appropriate solvents. As indicated, the three ingredients can merely be mixed and reacted or the reaction can be carried out in a suitable solvent if so desired.

When heating is employed, the reaction time can vary considerably. For example, the time can range anywhere from about 5 to 30 minutes or more depending to some extent, of course, on the temperature employed. Generally speaking, however, heating for about 15 to 30 minutes at the boiling point of the mixture is adequate to get substantially complete reaction.

While no special conditions of pressure or no special atmosphere is needed during the preparation of the complexes of this invention, sub-atmospheric pressures, super-atmospheric pressures, inert atmospheres and other special conditions can be employed if so desired.

Ideally, the silica, aromatic hydroxy compound and amine should be reacted in mol ratio of 1:3:2+ in order to produce the complexes of this invention. Of course, the essential thing is that a stoichiometric excess of amine be employed.

As pointed out above, silica per se or some other suitable source of silica can be used in preparing the complexes of this invention. Thus, for example, instead of employing silica one can use ethylorthosilicate, ethylpolysilicate, a silane of the formula $SiX_4$, wherein X is a hydrolyzable group, or hydrolyzates of such a silane. The hydrolyzable group X in the aforementioned silanes can be, for example, a halogen atom such as a fluorine, chlorine or bromine atom; an alkoxy group such as a methoxy, ethoxy, isopropoxy or a butoxy group; an aryloxy group such as a phenoxy group; an acyloxy group such as an acetoxy group; or a —$OCH_2CH_2OCH_3$,

or a —$NH_2$ group. Preferably X is a methoxy or ethoxy group.

Any aromatic compound having at least two hydroxy groups on the aromatic ring which are ortho to each other can be employed in making the complexes of this invention. Specific examples of such compounds that can be employed are catechol,
3-methylcatechol,
t-butylcatechol,
pyrogallol,
gallic acid,
4,5-dibromocatechol,
1,2-dihydroxynaphthalene,
2,3-dihydroxybiphenyl,
2,3,4-trihydroxybiphenyl,
2,3-dihydroxynaphthalene,
alizarin,
3-nitroalizarin,
3-methylalizarin,
1,2-anthracenediol,
anthragallol,
anthrapurpurin,
hexahydroxybenzene,
benzenetetrol,
protocatechuic acid,
adrenaline,
caffeic acid,
flavopurpurin,
gallacetophenone,
gallanilide,
gallein,
gallin,
1,2,4-benzenetriol,
hystazarin,
isonaphthazarin,
maclurin,
phenanthrahydroquinone,
2,3,4-trihydroxy-9-acridone,
2,3-dihydroxyquinoline,
cyanidin chloride,
2,3-dihydroxypyridine,
3,4-dihydroxyacridine,
3,4-dihydroxybenzoic acid,
quercetin,
the methyl ester of gallic acid,
3,4,5-phenanthrenetriol,
protocatechualdehyde,
purpurin,
2,3-dihydroxybenzoic acid,
quinalizarin,
rufigallic acid, and
rufiopin.

Thus, it can be seen that the only critical features of the radical to which the O' and O" oxygens are attached is that the oxygens be attached to an aromatic ring in the 1,2 relationship. Apart from these two features the aromatic radical can contain any number of aromatic rings and can have any kind and number of substituents on the aromatic ring or rings which are capable of existing with a phenolic hydroxyl.

The cation A of the complex is formed from the amine used in the preparation of the complex. The term "amine" as employed herein is intended to include ammonia or ammonium hydroxide and quaternary ammonium compounds as well as the conventional amines. All manner of ternary nitrogen compounds such as primary, secondary and tertiary aliphatic or aromatic amines, alkanolamines, hydrazines, guanidines and heterocyclic compounds such as pyridines can be employed. Specific examples of suitable amines are methylamine,
ethylamine,
propylamine,
isopropylamine,
butylamine,
amylamine,
hexylamine,
decylamine,
dodecylamine,
octadecylamine,
dimethylamine,
diethylamine,
methylamylamine,
triethylamine,
tripropylamine,
diethylmethylamine,
cyclohexylamine,
benzyldimethylamine,
aniline,
dimethylaniline,
toluidine,
ethanolamine,
diethanolamine,
triethanolamine,
ethylene diamine,
cadaverine,
hexamethylenediamine,
diethylenetriamine,
pyridine,
$H_2NCH_2CH_2CH_2(CH_3)_2SiOSi(CH_3)_2CH_2CH_2NH_2$,
$H_2NCH_2CH_2NHCH_2CH_2CH_2(CH_3)_2Si$—[—OSi$(CH_3)_2$—]$_{11}$—OSi$(CH_3)_2CH_2CH_2$—CH$_2$NHCH$_2$CH$_2$NH$_2$,
guanidine,
tetramethylguanidine,
melamine,
cinchonine,
strychnine,
brucine,
methylenedianiline,
metaphenylenediamine,
tetraethylenepentamine,
metaxylylenediamine,
tetramethylammonium hydroxide,
trimethyl-beta-hydroxy-ethylammonium hydroxide,
benzyltrimethylammonium hydroxide,
cetyltrimethylammonium hydroxide,
tallowtrimethylammonium hydroxide, and
2,4,6-tris(dimethylaminomethyl)phenol.

Mixtures of amines can be employed in making the complexes and for some uses such complexes are preferred.

It should be obvious to those skilled in the art that the ratio of anions to cations in the complex is such that there is an equal number of positive and negative charges in the complex. Thus, for example, when A is monovalent, there must be an anion to cation ratio of 1:2. When A is divalent, there must be an anion to cation ratio of 1:1. When A is trivalent, there must be an anion to cation ratio of 3:2 and so on. It should be understood that when A is polyvalent, divalent for example, that A can satisfy both valences of an anion or it can satisfy one valence of two different anions while other cations satisfy the other valences.

In speaking of valences of the cations formed from the amines, it might be well to mention here that it is the number of nitrogen atoms in the amine that become protonated during the reaction that is being referred to as the valence. Thus it follows that in the case of polyamines one or more nitrogen atoms can become protonated. For example, ethylene diamine can form either the singly protonated cation $H_2NCH_2CH_2NH_3^+$ or the doubly protonated cation $^+H_3NCH_2CH_2NH_3^+$.

As stated in the above definition, E is unprotonated amine and can be, of course, the same as the amine used to form cation A or it can be different. Generally speaking, amine E must be of such a molecular configuration or of such a chemical nature that it will be held in the complex. It should be noted at this point that the mechanism by which the unprotonated amine E is held in the complex is not known at this time. The unprotonated amine may be held by clathration, hydrogen bonding, some other means or a combination of these ways. It is known, however, that such complexes do exist and can be prepared by the method described below.

The subscript $m$ can be any value greater than zero, i.e. a fraction, an integer or a mixed number. When $m$ is a fraction, there is less than a full mol of unprotonated amine in the complex, and when $m$ is an integer or a mixed number there is at least one full mol or more of unprotonated amine in the complex.

In order that those skilled in the art can better understand how the present invention can be practiced, the following examples are given by way of illustration and not by way of limitation.

*Example 1*

To a one liter Erlenmeyer flask there was added 33 g. (0.3 mol) of catechol, 21 g. (0.1 mol) of ethylorthosilicate, 200 g. of isopropanol and 24 g. (0.4 mol) of ethylenediamine. The mixture was heated to reflux and then cooled to room temperature whereon crystallization took place. The crystalline product was filtered, washed twice with isopropanol, then washed with hexane, and finally evacuated to constant weight. 48.6 g. of product was obtained. It had a neutral equivalent of 94.4 and the structure

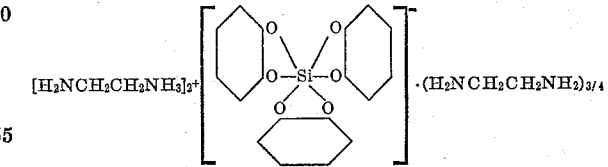

*Example 2*

The procedure of Example 1 was repeated except that only 18 g. (0.3 mol) of ethylenediamine was used. 44.7 g. of product was obtained. It had a neutral equivalent of 110 and the structure

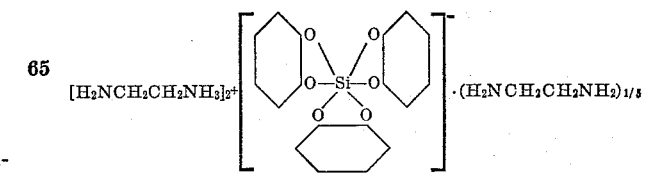

*Example 3*

To a one liter Erlenmeyer flask there was added 33 g. (0.3 mol) of catechol, 21 g. (0.1 mol) of ethylorthosilicate, 500 g. of methanol and 30 g. (0.6 mol hydrazine) of hydrazine hydrate. After about 2 minutes a crystalline precipitate began to form. The mixture was allowed to stand at room temperature for about 30 minutes and then the crystals filtered, washed well with methanol and finally evacuated to constant weight. 37.5 g. of product was obtained. It had a neutral equivalent of 150 and the structure

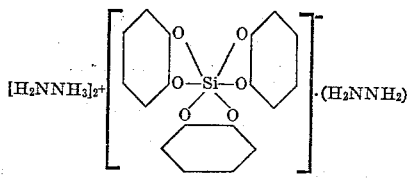

*Example 4*

To a flask there was added 33 g. (0.3 mol) of catechol, 15 g. (0.1 mol SiO₂) of "Ethylsilicate 40" (a commercial ethylpolysilicate which contains 40% silica), 200 g. of isopropanol and then a mixture of 18 g. (0.3 mol) of ethylene diamine and 25 g. of isopropanol. After a few minutes a crystalline precipitate began to form. The mixture was allowed to stand at room temperature for 1½ hours and then the product filtered out. The product was washed twice with isopropanol, then twice with hexane and then dried for 2 hours at 100° C. 42.8 g. of product was obtained. It had a neutral equivalent of 118.8 and the structure

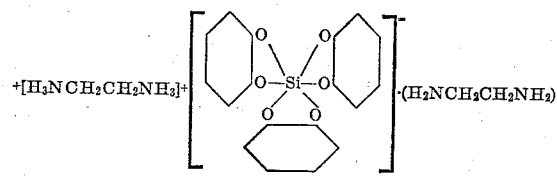

*Example 5*

To a solution of 20.8 g. (0.1 mol) of ethylorthosilicate and 33 g. (0.3 mol) of catechol in 100 cc. of methanol, there was added a mixture of 6 g. (0.1 mol) of ethylenediamine and 10 g. (0.1 mol) of hydrazine hydrate. The addition of the amines caused an exotherm and a white solid precipitated from the solution. The product was filtered, washed and evacuated to constant weight. 34 g. of product was obtained. It had a neutral equivalent of 127.5 and the structure

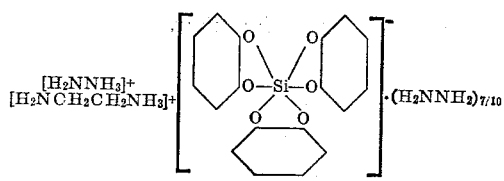

*Example 6*

To a 125 ml. Erlenmeyer flask there was added 5.4 g. (0.03 mol) of 4,5-dichlorocatechol, 2.1 g. (0.01 mol) of ethylorthosilicate, 20 g. of isopropanol and 2 g. (0.033 mol) of ethylenediamine. The mixture was heated to a boil and held there for about 30 minutes after which time a white solid had formed. The mixture was cooled to room temperature, the product filtered, washed first with isopropanol and then with hexane, and then evacuated to constant weight. 3.2 g. of product was obtained. The product had a melting point of 205–210° C., a neutral equivalent of 126 and the structure

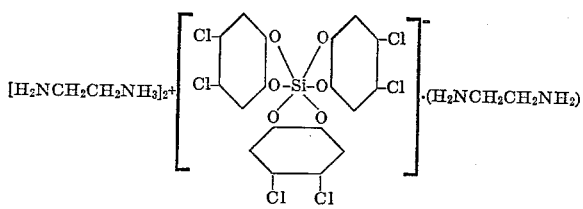

*Example 7*

A powdered coating composition was prepared which consisted essentially of 100 parts of a solid epoxy resin and 5.5 parts of the complex of Example 2. The composition had a gel time of 14 seconds at 400° F. The resin was a reaction product of Bisphenol A and epichlorhydrin, had an epoxide equivalent weight of about 925, a softening point of about 99° C., a refractive index of 1.5971 and a specific gravity of 1.183. Metal panels 1″ x 4″ and 60 mils thick were coated with the composition by preheating the panel to 455° F., coating the panel with the powder, allowing the coating to cure for various lengths of time and then cooling the panel with cold water. The coating on the panel was then tested for impact resistance on a Gardner Impact Tester. The tester employed was essentially the same as the one described on page 147 of the "Paint Testing Manual, Physical and Chemical Examination Paints, Varnishes, Lacquers and Colors," twelfth edition, March 1962, by Gardner and Seward. The actual tester employed in the test below had a four pound, round-nose steel impact rod and the scale along the slot gave inch pounds of impact from 0 to 160 in steps of 4. The test consists of placing a coated metal panel (coated side up) on the base plate, lifting the impact rod to the desired level, and then allowing the rod to drop onto the panel. Testing was started at 30 inch-pounds of impact. This procedure is repeated increasing the impact force each time until the impact destroys the coating. This value is then reported as the "Impact" resistance of the coating in inch-pounds. When a minus value of inch-pounds is reported, this means that the coating provides impact resistance which is less than the specified value. When a plus value of inch-pounds is reported, this means that the coating provides impact resistance which exceeds the specified value or in the case of 160+ inch pounds the impact resistance exceeds the limits of the equipment used for testing this property. The cure times and test results are set forth in the table below.

| Cure time (seconds) | 30 | 45 | 60 | 75 | 90 | 120 |
|---|---|---|---|---|---|---|
| Impact (inch-pounds) | −30 | +160 | +160 | +160 | +160 | +160 |

*Example 8*

When the following compounds are substituted for catechol in any of the above examples, equivalent results are obtained:

3-methylcatechol
4,5-dibromocatechol
2,3-dihydroxynaphthalene
2,3-dihydroxybenzoic acid
pyrogallol
gallic acid
3,4,5-phenanthrenetriol
2,3-dihydroxybiphenyl

I claim:
1. Hexacoordinate silicon complexes having the general formula

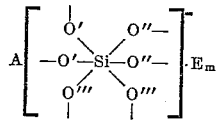

wherein the O′ oxygen atoms are attached to carbon atoms of an aromatic ring which are ortho to each other, the O″ oxygen atoms are attached to carbon atoms of an aromatic ring which are ortho to each other, the O‴ oxygen atoms are attached to carbon atoms of an automatic ring which are ortho to each other, A is a cation formed from an amine, E is unprotonated amine and m has a value greater than zero.

2. The hexacoordinate silicon complexes of claim 1 having the general formula

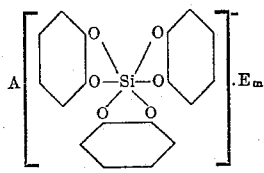

3. The hexacoordinate silicon complexes of claim 2 having the general formula

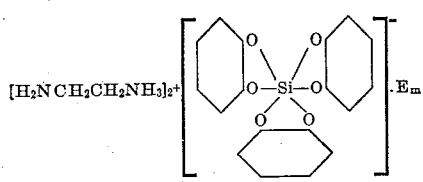

4. The hexacoordinate silicon complex

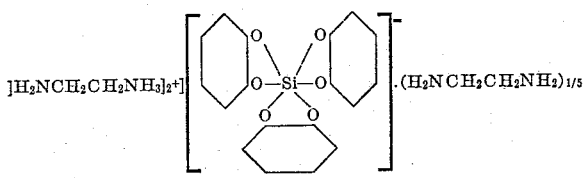

5. The hexacoordinate silicon complex

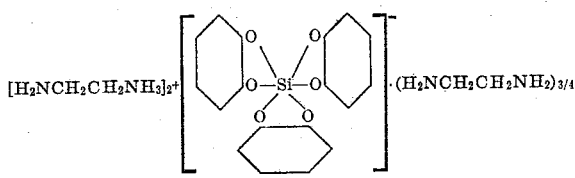

6. The hexacoordinate silicon complex

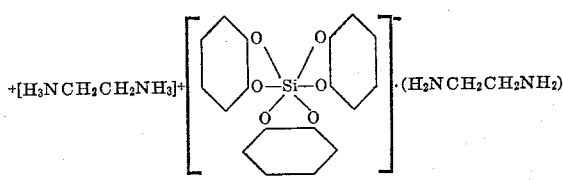

7. The hexacoordinate silicon complexes of claim 2 having the general formula

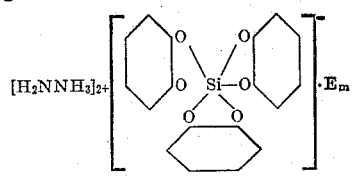

8. The hexacoordinate silicon complex

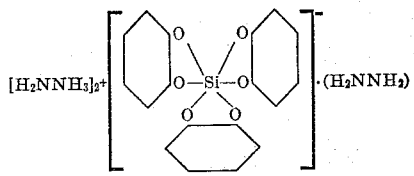

9. A method for preparing hexacoordinate silicon complexes having the general formula

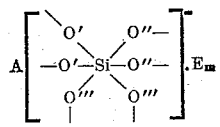

wherein the O′ oxygen atoms are attached to carbon atoms of an aromatic ring which are ortho to each other, the O″ oxygen atoms are attached to carbon atoms of an aromatic ring which are ortho to each other, the O‴ oxygen atoms are attached to carbon atoms of an aromatic ring which are ortho to each other, A is a cation formed from an amine, E is unprotonated amine and $m$ has a value greater than zero, which method comprises reacting (1) a silica source,
(2) an aromatic compound having at least two hydroxy groups on the aromatic ring which are ortho to each other and
(3) a stoichiometric excess of an amine, whereby the above hexacoordinate complexes are obtained.

References Cited

UNITED STATES PATENTS 3,133,108  5/1964  Finestone _____ 260—448.2

TOBIAS E. LEVOW, *Primary Examiner.*

P. F. SHAVER, *Assistant Examiner.*